(12) United States Patent
Hasselius

(10) Patent No.: US 12,422,864 B1
(45) Date of Patent: Sep. 23, 2025

(54) MOBILE IoT UNIT FOR CLEANING GREASE VENTS

(71) Applicant: Dustin Hasselius, Mora, MN (US)

(72) Inventor: Dustin Hasselius, Mora, MN (US)

( * ) Notice: Subject to any disclaimer, the term of this patent is extended or adjusted under 35 U.S.C. 154(b) by 0 days.

(21) Appl. No.: 19/007,504

(22) Filed: Jan. 1, 2025

(51) Int. Cl.
| | |
|---|---|
| *G05D 1/648* | (2024.01) |
| *B08B 3/02* | (2006.01) |
| *B08B 5/04* | (2006.01) |
| *B08B 7/00* | (2006.01) |
| *B08B 13/00* | (2006.01) |
| *B62D 55/265* | (2006.01) |
| *F24C 15/20* | (2006.01) |
| *G05D 1/222* | (2024.01) |
| *G05D 111/20* | (2024.01) |
| *G05D 101/00* | (2024.01) |
| *G05D 101/10* | (2024.01) |
| *G05D 105/10* | (2024.01) |
| *G05D 107/50* | (2024.01) |
| *G05D 111/10* | (2024.01) |

(52) U.S. Cl.
CPC .............. *G05D 1/648* (2024.01); *B08B 3/024* (2013.01); *B08B 5/04* (2013.01); *B08B 7/0042* (2013.01); *B08B 13/00* (2013.01); *B62D 55/265* (2013.01); *G05D 1/222* (2024.01); *B08B 2203/02* (2013.01); *F24C 15/20* (2013.01); *G05D 2101/10* (2024.01); *G05D 2101/22* (2024.01); *G05D 2105/10* (2024.01); *G05D 2107/50* (2024.01); *G05D 2111/14* (2024.01); *G05D 2111/20* (2024.01)

(58) Field of Classification Search
CPC .... G05D 1/648; G05D 1/222; G05D 2101/10; G05D 2101/22; G05D 2105/10; G05D 2107/50; G05D 2111/14; G05D 2111/20; B08B 3/024; B08B 5/04; B08B 7/0042; B08B 13/00; B08B 2203/02; B62D 55/265; F24C 15/20
See application file for complete search history.

(56) References Cited

FOREIGN PATENT DOCUMENTS

CN 113441501 A * 9/2021 ............ F26B 21/001

OTHER PUBLICATIONS

CN113441501 translation (Year: 2021).*

* cited by examiner

*Primary Examiner* — Levon J Shahinian
*Assistant Examiner* — Lauren G Orta
(74) *Attorney, Agent, or Firm* — Sandy Lipkin

(57) ABSTRACT

A mobile internet of things (IoT) unit for cleaning grease vents, herein referred to as the 'unit,' is disclosed. The unit is comprised of the following parts: a mobile platform with magnetic tracks; a mobile device software application (app); cleaning attachments such as power washers and lasers, sensors such as conductivity meters (to measure buildup), air temperature, velocity and pressure; recording devices such as digital still and streaming cameras; a microcontroller with wireless communications; onboard lighting and a rechargeable battery. Additional details regarding the unit are examined further in this disclosure.

9 Claims, 4 Drawing Sheets

BOTTOM SECTION VIEW

MOBILE IoT UNIT FOR CLEANING GREASE VENTS

BACKGROUND OF THE INVENTION

Field of the Invention

The present invention generally relates to grease vents. More specifically, it relates to a mobile IoT unit for cleaning grease vents.

Description of the Prior Art

Cleaning grease vents, particularly those routed through tight or narrow spaces due to renovations, involves numerous challenges that extend beyond the typical maintenance process. Over time, grease accumulates within the ducts as airborne particles from cooking exhaust adhere to the vent surfaces. This buildup poses a dual threat: it not only diminishes the efficiency of the ventilation unit but also creates a significant fire hazard. Grease is highly flammable, and in the presence of a heat source, such as a flare-up in the kitchen or even normal high-temperature cooking, it can ignite, potentially leading to catastrophic fires. The challenges become even more pronounced when the venting unit has been rerouted or compressed into confined spaces during renovations. These design modifications often result in sharp bends, narrow passageways, and hard-to-reach sections of ductwork. Cleaning tools and technicians face significant obstacles in accessing these areas, as standard equipment may not fit, and manual scrubbing is often impractical or impossible. Specialized tools, such as flexible cleaning rods, rotary brushes 20, or steam-cleaning units, may be required, adding to the complexity and cost of maintenance. The difficulty of cleaning these narrow or irregular vents is further compounded by safety considerations. Workers cleaning grease-laden ducts in cramped spaces may be exposed to harmful fumes or cleaning chemicals, which can become trapped in the restricted environment. Proper ventilation is crucial during cleaning to mitigate these risks, but it may be challenging to achieve in confined spaces. Additionally, the process often involves the use of pressurized hot water, steam, or industrial degreasers, which must be handled carefully to prevent damage to the ductwork or surrounding structures.

Another significant concern is compliance with fire safety and health regulations. Inaccessible sections of grease vents are often overlooked during routine maintenance, leaving hidden deposits of grease that continue to accumulate and heighten fire risks. If not properly addressed, this can lead to violations of safety codes, increased liability, and potential business interruptions. Addressing these challenges requires a multi-faceted approach. Preventative maintenance schedules should be more frequent for units with difficult-to-clean designs, and building owners or operators should consider investing in professional cleaning services with expertise in handling complex duct configurations. In some cases, redesigning the vent unit to improve accessibility and minimize grease buildup may be the most effective long-term solution. What is needed is a unit that can clean hard-to-reach grease vents effectively and efficiently.

SUMMARY OF THE INVENTION

The device herein disclosed and described provides a solution to the shortcomings in the prior art through the disclosure of a mobile IoT unit for cleaning grease vents. An object of the invention is to clean vents that are difficult to reach using traditional manual methods. For example, a narrowing vent that is away from service panel openings that is difficult to clean may be overlooked which can lead to significant grease buildup over time and represent a fire hazard. The unit can easily enter this type of vent and perform cleaning operations to eliminate the hazard.

Another object of the unit is to provide a means to clean vertical vents. The unit includes a magnetic track allowing it to easily scale vertical walls inside a vent.

Another object of the invention is to provide a means to affix multiple attachments. The unit is modular in the sense that various cleaning attachments can be affixed to the unit such as foaming wands, power washes and lasers (for extreme, hardened grease spots).

Another object of the invention is to provide enhance vent examination capability. The unit has onboard lights and cameras that send images to the user in real time by means of an app. This extended visual reach allows users to better understand interior duct conditions in order to focus cleaning operations more reliably.

Another object of the invention is to provide a means to transmit vent images to a cloud network for record keeping and compliance. The unit comes with an onboard microcontroller with WiFi and Bluetooth communications that can send images and stream video to a network.

Another object of the invention is to provide a means to monitor vent performance in real time as a cleaning is taking place. Sensors on the unit allow a user to measure air velocity, air temperature and air pressure to ensure parameter are withing standard specifications to ensure compliance.

Another object of the invention is to provide a means to allow users to remotely control the unit and monitor vent cleaning operations with an app. Operators can use their existing cell phones and mobile devices to interact directly with the unit via Bluetooth and wireless communications.

It is briefly noted that upon a reading this disclosure, those skilled in the art will recognize various means for carrying out these intended features of the invention. As such it is to be understood that other methods, applications and units adapted to the task may be configured to carry out these features and are therefore considered to be within the scope and intent of the present invention, and are anticipated. With respect to the above description, before explaining at least one preferred embodiment of the herein disclosed invention in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and units for carrying out the several purposes of the present disclosed device. It is important, therefore, that the claims be regarded as including such equivalent construction and methodology insofar as they do not depart from the spirit and scope of the present invention.

As used in the claims to describe the various inventive aspects and embodiments, "comprising" means including, but not limited to, whatever follows the word "comprising".

Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present.

By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements. The objects features, and advantages of the present invention, as well as the advantages thereof over existing prior art, which will become apparent from the description to follow, are accomplished by the improvements described in this specification and hereinafter described in the following detailed description which fully discloses the invention.

BRIEF DESCRIPTION OF THE DRAWINGS

For a better understanding of the present invention, reference is to be made to the accompanying drawings. It is to be understood that the present invention is not limited to the precise arrangement shown in the drawings.

Figure 1:
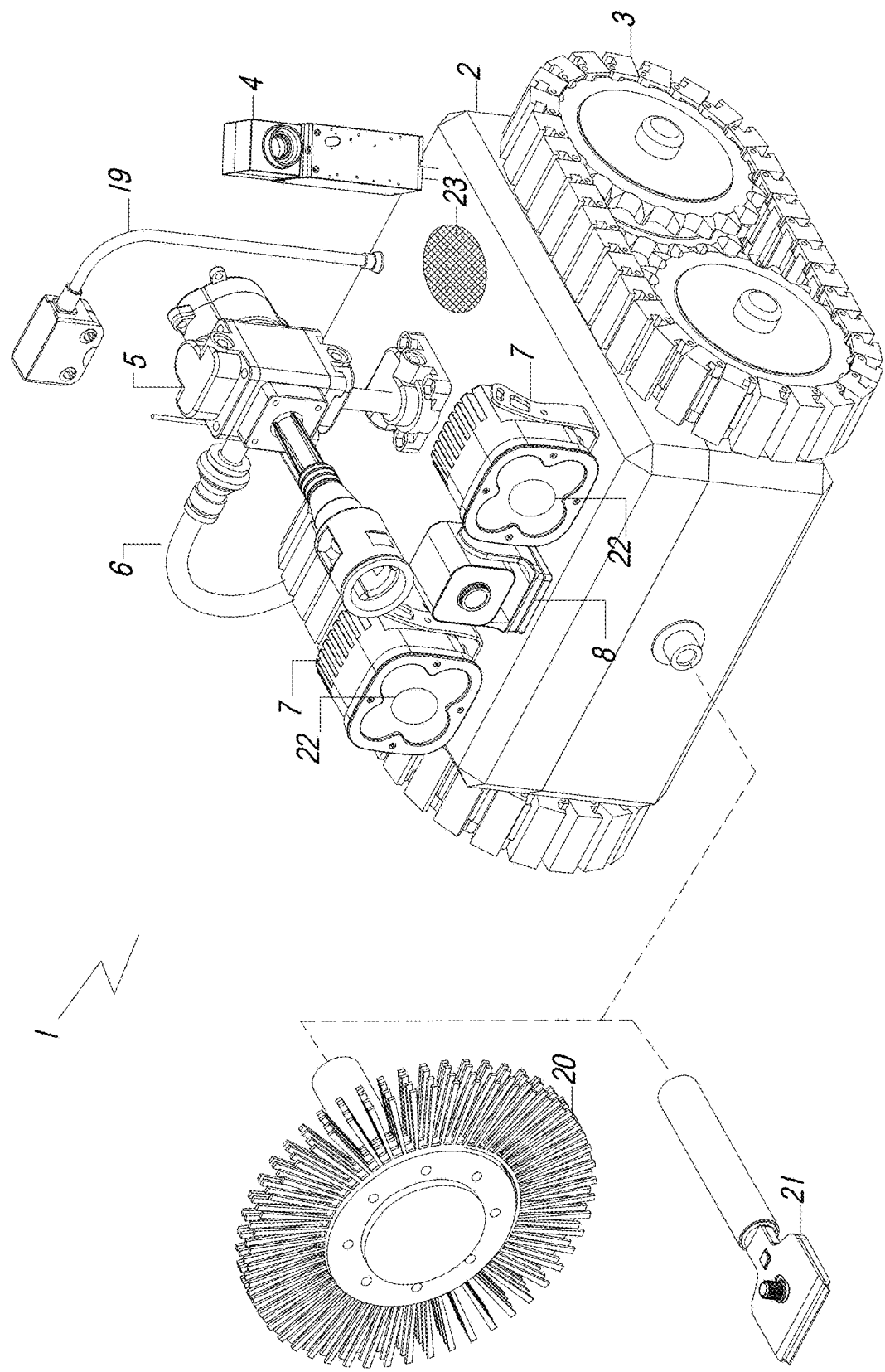
FIG. 1 shows a top perspective view of the unit.

Other aspects of the present invention shall be more readily understood when considered in conjunction with the accompanying drawings, and the following detailed description, neither of which should be considered limiting.

DETAILED DESCRIPTION OF A PREFERRED EMBODIMENT

Turning to the drawings, the preferred embodiment is illustrated and described by reference characters that denote similar elements throughout the several views of the instant invention.

In this description, the directional prepositions of up, upwardly, down, downwardly, front, back, top, upper, bottom, lower, left, right and other such terms refer to the unit as it is oriented and appears in the drawings and are used for convenience only; they are not intended to be limiting or to imply that the device has to be used or positioned in any particular orientation. Conventional components of the invention are elements that are well-known in the prior art and will not be discussed in detail for this disclosure.

Figure 2:
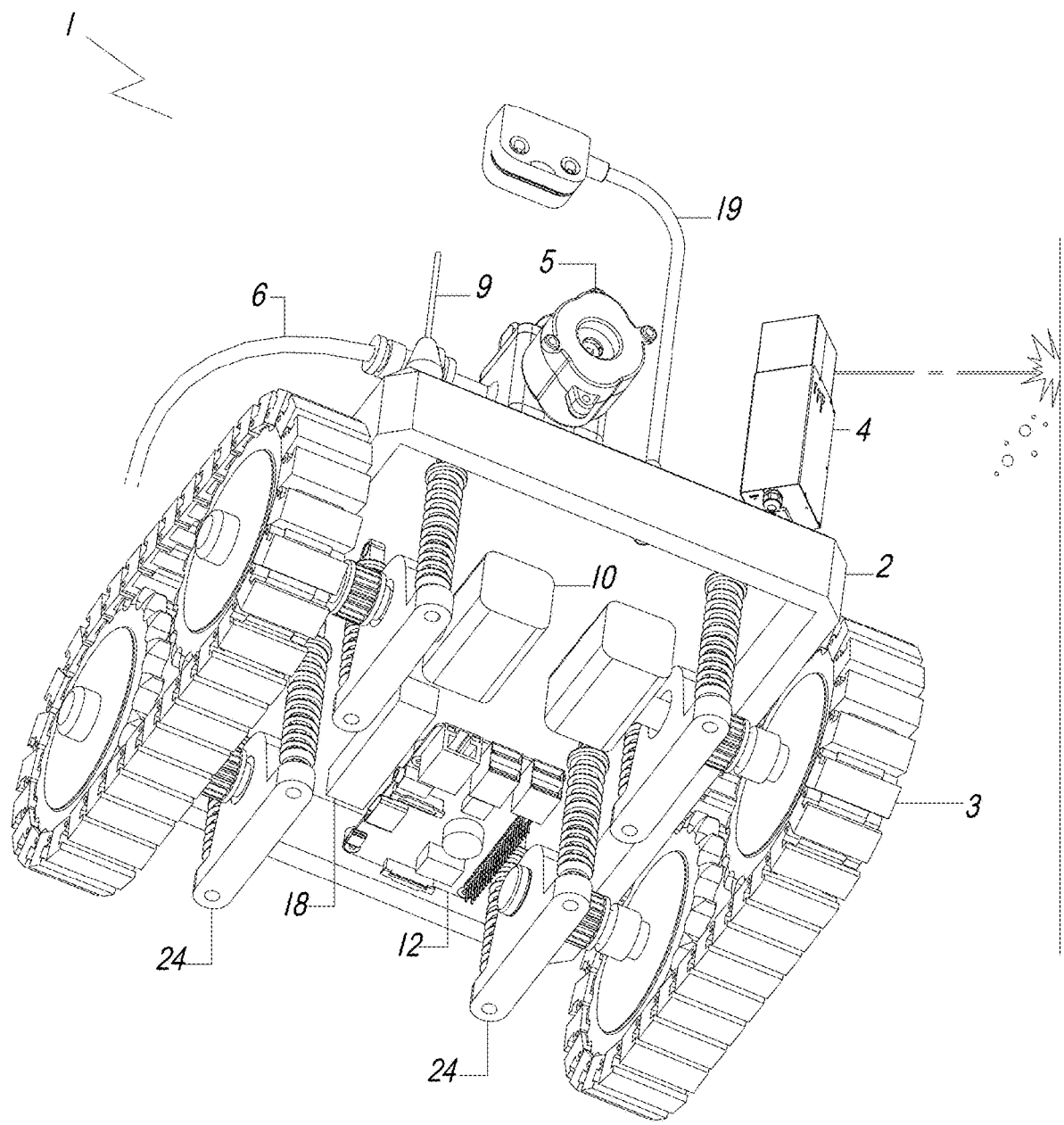
FIG. 2 shows a bottom section view of the unit.
Figure 3:
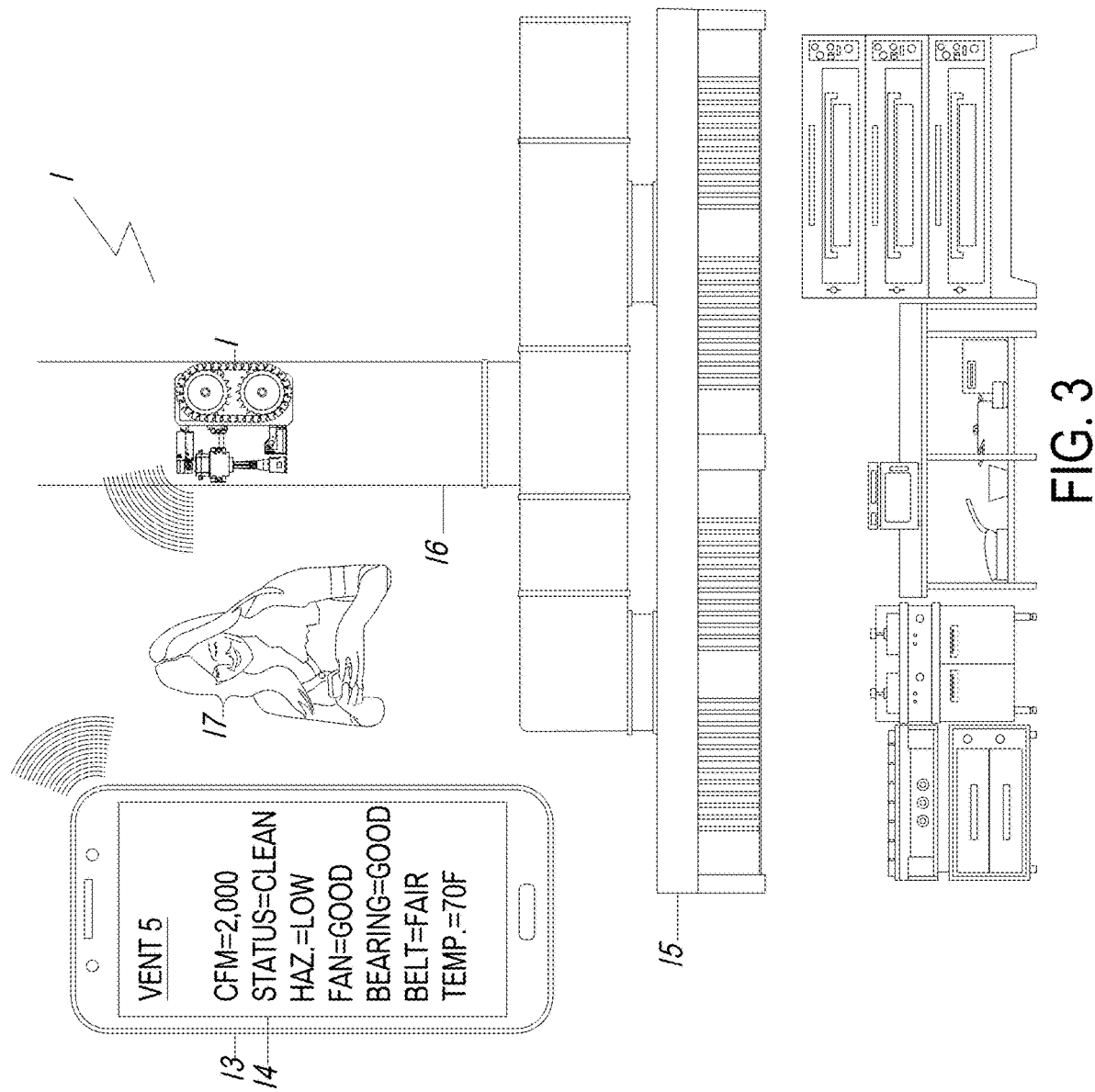
FIG. 3 shows a perspective view of a unit inside a vent communicating with a user.

FIGS. 1-3 show a preferred embodiment of the mobile IoT Unit 1 for cleaning grease vents and it is an advanced, highly engineered device designed to revolutionize the cleaning, inspection, and maintenance of grease vent systems in commercial and industrial environments as depicted in FIG. 3. This unit 1 combines innovative mechanical design, cutting-edge cleaning technologies, robust sensor arrays, real-time data communication, and intelligent automation to address the complex challenges associated with maintaining grease vents. Built on a foundation of a compact and lightweight mobile platform, the unit operates efficiently within narrow and constrained spaces, making it ideal for industrial kitchen environments where grease accumulation can severely impact air quality and fire safety. The mobile unit 1 itself is constructed from a high-strength, corrosion-resistant material including but not limited to aluminum alloy and carbon fiber and the like. This material is specifically chosen to withstand prolonged exposure to humid, greasy, and high-temperature conditions commonly found in grease ducts. With dimensions of but not limited to 16 inches in length, 12 inches in width, and 8 inches in height, unit 1's platform is engineered to fit into vents with cross-sections as small as 18 inches, ensuring accessibility to areas where manual cleaning methods are impractical. Despite its compact size, the platform supports a payload of at least five pounds, accommodating cleaning tools, sensors, and onboard electronics with ease.

The unit 1's mobility is powered by precision stepper motors 10 (depicted in FIG. 2), which are capable of micro-stepping to achieve precise positioning and speed control. These motors 10 allow movement at adjustable speeds ranging from 0.0 to at least 0.3 meters per second, enabling slow, deliberate cleaning passes or faster traversal as required by a user who have the ability to control it using the app 14 on their mobile device 13 as depicted in FIG. 3. Said motors 10 are integrated with a magnetic track system 3 designed to securely adhere the platform to ferromagnetic surfaces shown in FIG. 1. Each track 3 uses rare-earth neodymium magnets embedded in a durable, rubberized tread material that provides strong magnetic adhesion while reducing wear and tear on the vent walls. This magnetic system is essential for enabling vertical and inverted travel within ducts, where gravity and slick grease deposits would otherwise hinder movement. For stability on uneven surfaces, the platform incorporates an independent suspension system. This system uses spring-damper assemblies for each track module, ensuring consistent contact with the vent surface, reducing vibrations, and maintaining the precision of onboard sensors 19 and cleaning tools during operation.

At the heart of the system's cleaning capabilities is a modular suite of tools designed to tackle a variety of grease removal tasks with efficiency and adaptability including but not limited to: a foam sprayer 5 which is a cornerstone of unit 1 and is equipped with a precision-engineered swivel joint. This rotation ensures even distribution of cleaning agents such as foam, detergents, or water-based solutions. The sprayer 5 connects to standard pressure hoses 6 and supports interchangeable nozzles that operate at pressures between at least 500 to 2,500 PSI with a flow rate of 2.5 gallons per minute, providing versatility for light or heavy-duty cleaning applications. The nozzles are equipped with a self-cleaning mechanism to prevent clogging from grease buildup, ensuring consistent performance over extended cleaning sessions. Complementing the sprayer is a thermally stabilized stainless steel nozzle, ensuring reliable operation even in high-temperature environments. A vacuum attachment is also included that captures up to 95% of grease particles and debris dislodged during cleaning. The vacuum integrates a HEPA air filtration system 23 to prevent fine particulate matter from escaping back into the vent, thereby maintaining air quality and safety. Additionally, a pneumatic tool connection is available for air-driven cleaning tools such as scrapers 21, brushes 20, and augers etc., This connection supports pressures of up to 120 PSI and features a quick-connect coupling system, allowing operators to switch tools rapidly without interrupting workflow.

The most advanced cleaning tool in the system is its laser cleaning module 4, which employs a water-cooled, pulsed fiber laser capable of outputting 200 to 1,000 watts of power at a wavelength of 1,064 nm. This laser is specifically designed to vaporize hardened grease deposits without causing thermal damage to the underlying vent material. The laser beam is directed using a high-speed galvanometer-based steering mechanism, allowing precise targeting and controlled the most stubborn grease buildup. The cleaning of even steering system is dynamically adjusted using real-time sensor 19 feedback to optimize cleaning effectiveness while minimizing energy consumption. To ensure consistent performance, the laser module is integrated with a closed-loop cooling system that maintains its operating temperature within ±1° C., preventing overheating and extending the lifespan of the laser diode.

To optimize cleaning performance and operational safety, the system includes a sophisticated array of sensors 19 including but not limited to: a laser temperature sensor continuously monitoring the laser's surface temperature with an accuracy of ±0.1° C., ensuring safe operation and consistent energy delivery. An air velocity sensor (such as a digital or ultrasonic anemometer etc.), designed to anemometer-grade standards, measures airflow within the vent, with a range of at least 0.1 to 20 meters per second. This data provides critical insight into vent functionality and helps assess the effectiveness of the cleaning process. The air temperature sensor uses a high-sensitivity thermocouple to detect rapid temperature fluctuations in the vent environment, providing essential feedback for thermal management. The system's obstacle detection sensors, which combine infrared and ultrasonic technologies, create a real-time 3D map of the vent interior. These sensors detect obstructions within a range of up to 100 centimeters, allowing the system to navigate complex geometries and avoid collisions inside a vent during cleaning.

For inspection, documentation, and quality assurance, the system is equipped with high-resolution imaging capabilities 8. At least a 12-megapixel digital still camera detailed photographs of the vent's interior, captures enabling operators to document conditions before and after cleaning. A 1080p streaming video camera also provides real-time visuals at 60 frames per second, allowing remote monitoring and live feedback. Both devices are equipped with low-light enhancement technologies, ensuring clear imaging in poorly lit vent environments. To further enhance visibility, the system features a remotely controlled LED lighting array 7 capable of delivering up to at least 800 lumens. The lighting system 7 uses optical diffusers 22 to provide uniform illumination, reducing glare and shadows to improve clarity during cleaning and inspection.

The system is powered by an onboard, 48V, 15 Ah lithium-ion, rechargeable, battery pack 18, which provides up to four hours of continuous operation. The battery 18 incorporates advanced thermal management systems to maintain optimal performance across a wide temperature range such as −14° F. to 140° F. (−10° C. to 60° C.). The battery 18 pack's hot-swappable design allows operators to replace the battery during extended cleaning sessions without interrupting operations. Overcharge and overcurrent protection circuitry further ensures the battery's long-term reliability and safety. As depicted in FIG. 2, a dual-core microcontroller 12 governs the system's operations, processing data from sensors, imaging devices, antenna 9 and cleaning tools in real time. Wireless communication capabilities include Wi-Fi (802.11ac) for high-speed data transmission to cloud systems and Bluetooth 5.0 for short-range connectivity with mobile devices and diagnostics tools.

The cloud-based operations management system processes and organizes data collected during cleaning sessions. This data includes sensor readings, visual records, and cleaning history, which are used to generate detailed reports, optimize cleaning and schedules, ensure regulatory compliance. Advanced algorithms analyze historical and real-time data to predict future cleaning requirements and provide actionable insights. In advanced embodiments, the system incorporates artificial intelligence (AI) for autonomous operation. This AI utilizes machine learning models trained on grease accumulation patterns and vent usage data to predict the type, duration, and intensity of cleaning required. The AI dynamically adjusts cleaning parameters, tool selection, and movement paths in real time, reducing energy consumption and operator intervention while ensuring thorough and efficient cleaning. Still other embodiments can incorporate a unit 1 that is permanently stored on site and acts autonomously only when buildup exceeds pre-determined thresholds.

Figure 4:
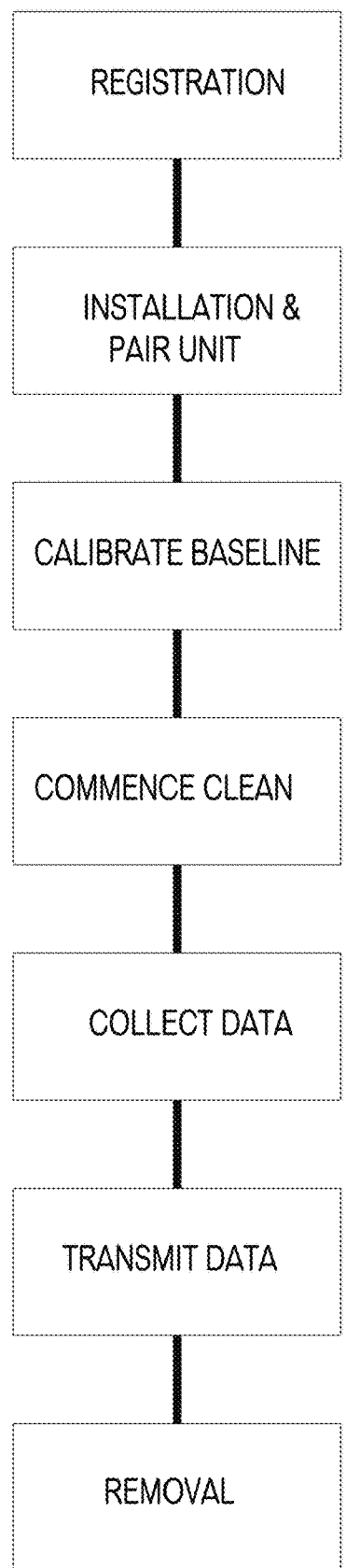
FIG. 4 shows a representative view of the unit's method.

The system's case 2 design is highly durable and adaptable. Sealed electronics and corrosion-resistant materials ensure reliability in the humid, greasy, and high-temperature conditions typical of industrial grease vents. Its modular architecture allows for easy component replacement and upgrades, extending its operational lifespan and enabling customization for specific cleaning requirements. This level of engineering makes the Mobile IoT Unit for Cleaning Grease Vents an unparalleled solution for grease vent maintenance, combining precision, efficiency, safety, and compliance in a single, highly advanced package. FIG. 4 shows a representative view of the unit's method that include but are not limited to the following steps: a user registering their unit onto the system's cloud network which may include a subscription service and allowing them access to said app 14 that relays unit status and sensor data in installing the unit 1 into a vent and pairing a real time; unit (or multiple units) to said app 14; sensors performing baseline measurements to understand a vent's current parameters (such as but not limited to operating pressures, air velocities in cubic feet per minute, temperature and pressure etc.); commencing the washing and cleaning operation (also include laser use on solidified grease spots); collecting aforementioned sensor data at intervals a user presets on said app 14; transmitting data from unit 1 to a multitude of receivers (such as a cloud network, the app 14; personal networks and the like); and terminating a vent cleaning session by removing unit 1 from a vent.

It is additionally noted and anticipated that although the device is shown in its most simple form, various components and aspects of the device may be differently shaped or slightly modified when forming the invention herein. As such those skilled in the art will appreciate the descriptions and depictions set forth in this disclosure or merely meant to portray examples of preferred modes within the overall scope and intent of the invention, and are not to be considered limiting in any manner. While all of the fundamental characteristics and features of the invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the scope of the invention.

The invention illustratively disclosed herein suitably may be practiced in the absence of any element which is not specifically disclosed herein.

The discussion included in this detailed description is intended to serve as a basic description. The reader should be aware that the specific discussion may not explicitly describe all embodiments possible and alternatives are implicit. Also, this discussion may not fully explain the generic nature of the invention and may not explicitly show how each feature or element can actually be representative or equivalent elements. Again, these are implicitly included in this disclosure. Where the invention is described in device-oriented terminology, each element of the device implicitly performs a function. It should also be understood that a variety of changes may be made without departing from the essence of the invention. Such changes are also implicitly included in the description. These changes still fall within the scope of this invention.

Further, each of the various elements of the invention and claims may also be achieved in a variety of manners. This disclosure should be understood to encompass each such variation, be it a variation of any apparatus embodiment, a method embodiment, or even merely a variation of any element of these. Particularly, it should be understood that as the disclosure relates to elements of the invention, the words for each element may be expressed by equivalent apparatus terms even if only the function or result is the same. Such equivalent, broader, or even more generic terms should be considered to be encompassed in the description of each element or action. Such terms can be substituted where desired to make explicit the implicitly broad coverage to which this invention is entitled. It should be understood that all actions may be expressed as a means for taking that action or as an element which causes that action. Similarly, each physical element disclosed should be understood to encompass a disclosure of the action which that physical element facilitates. Such changes and alternative terms are to be understood to be explicitly included in the description.

What is claimed is:

1. A system for cleaning grease vents, comprising:
   a) a mobile platform constructed from a high-strength, corrosion-resistant material and having dimensions enabling operation within vents of at least 18 inches in cross-section, said platform further comprising precision stepper motors configured for micro-stepping and adjustable speed control ranging from 0.0 to at least 0.3 meters per second, a magnetic track system including rare-earth neodymium magnets embedded in a rubberized tread material for secure vertical and inverted traversal along ferromagnetic surfaces, an independent suspension system comprising spring-damper assemblies for stabilizing movement on uneven surfaces;
   b) a modular cleaning system including but not limited to a rotating sprayer wand equipped with interchangeable nozzles for delivering cleaning agents at pressures ranging from at least 500 to 2,500 pounds per square inch, a laser cleaning module comprising a water-cooled, pulsed fiber laser operating at a wavelength of 1,064 nanometers and a power output of 200 to 1,000 watts, directed by a galvanometer-based beam steering mechanism, a vacuum attachment including a dual-stage high-efficiency particulate air filtration system;
   c) a plurality of onboard sensors configured to provide real-time operational feedback, said sensors including but not limited to a laser temperature sensor for monitoring the operating temperature of the laser module, an air velocity sensor measuring airflow within the vent, and an obstacle detection sensor array comprising infrared and ultrasonic sensors for generating a real-time three-dimensional map of the vent interior;
   d) at least one imaging device selected from a group comprising a 12-megapixel digital still camera and a 1080p streaming video camera with low-light enhancement capabilities;
   e) an LED lighting array configured to deliver at least 800 lumens for enhanced visibility during operation;
   f) a microcontroller configured to process data from the sensors, imaging devices, and cleaning tools, said microcontroller further comprising wireless communication modules for transmitting data via Wi-Fi and Bluetooth; and
   g) a rechargeable lithium-ion battery pack rated at 48 volts and 15 ampere-hours for providing up to four hours of continuous operation, said battery pack including hot-swappable functionality and overcharge protection circuitry.

2. The system of claim 1, wherein the modular cleaning system further comprises a pneumatic tool connection supporting air-driven scrapers and brushes with quick-connect couplings for tool interchangeability.

3. The system of claim 1, wherein the LED lighting array includes optical diffusers to ensure uniform light distribution and reduce glare.

4. The system of claim 1, wherein the microcontroller integrates artificial intelligence to analyze grease accumulation patterns and dynamically adjust cleaning parameters, including cleaning tool selection and operational path optimization.

5. The system of claim 1, wherein the rechargeable lithium-ion battery pack operates in an ambient temperature range of −14° F. to 140° F. (−10° C. to 60° C.).

6. A non-transitory computer-readable medium storing instructions that, when executed by a processor, cause a mobile IoT cleaning system for grease vents to perform a method comprising the following steps:
   a) providing the system of claim 1;
   b) pairing a mobile unit with a user device via a software application using wireless communication protocols, said user device enabling remote control of the mobile unit;
   c) registering the mobile unit onto a cloud-based network, wherein the network stores operational data and cleaning history;
   d) initiating a cleaning operation by deploying the mobile unit into a grease vent, wherein onboard sensors perform baseline measurements of vent parameters, including air velocity, air pressure, and air temperature;
   e) activating modular cleaning attachments;
   f) collecting and transmitting real-time sensor and imaging data to the cloud network and the user device;
   g) dynamically adjusting cleaning operations, including laser focus and cleaning duration, based on real-time sensor feedback; and
   h) terminating the cleaning operation, wherein collected data is stored in the cloud network and accessible via the software application for compliance and record-keeping purposes.

7. The non-transitory computer-readable medium of claim 6, wherein the instructions further include predicting cleaning intensity and duration based on grease buildup patterns detected by onboard sensors.

8. The non-transitory computer-readable medium of claim 6, wherein the application generates compliance documentation automatically based on the cleaning data stored on the cloud network.

9. The non-transitory computer-readable medium of claim 6, wherein the method includes enabling multiple mobile units to communicate with the same software application for simultaneous operation within a shared vent system.

* * * * *